C. VANGIESEN.
FOLDABLE WHEELBARROW.
APPLICATION FILED JUNE 9, 1919.
1,418,754.
Patented June 6, 1922.
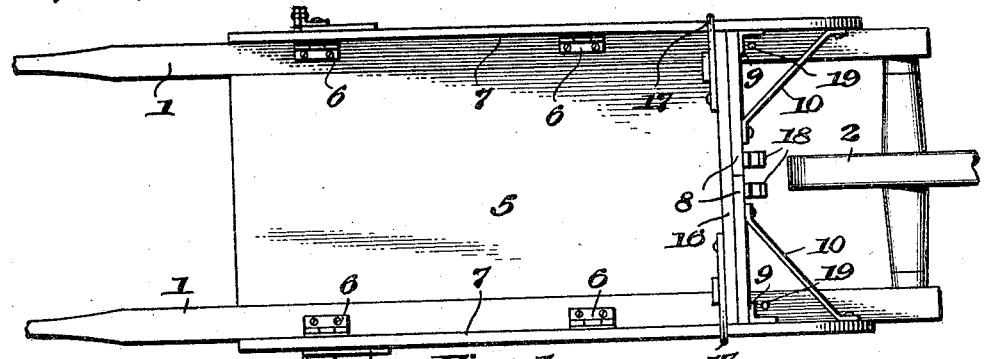
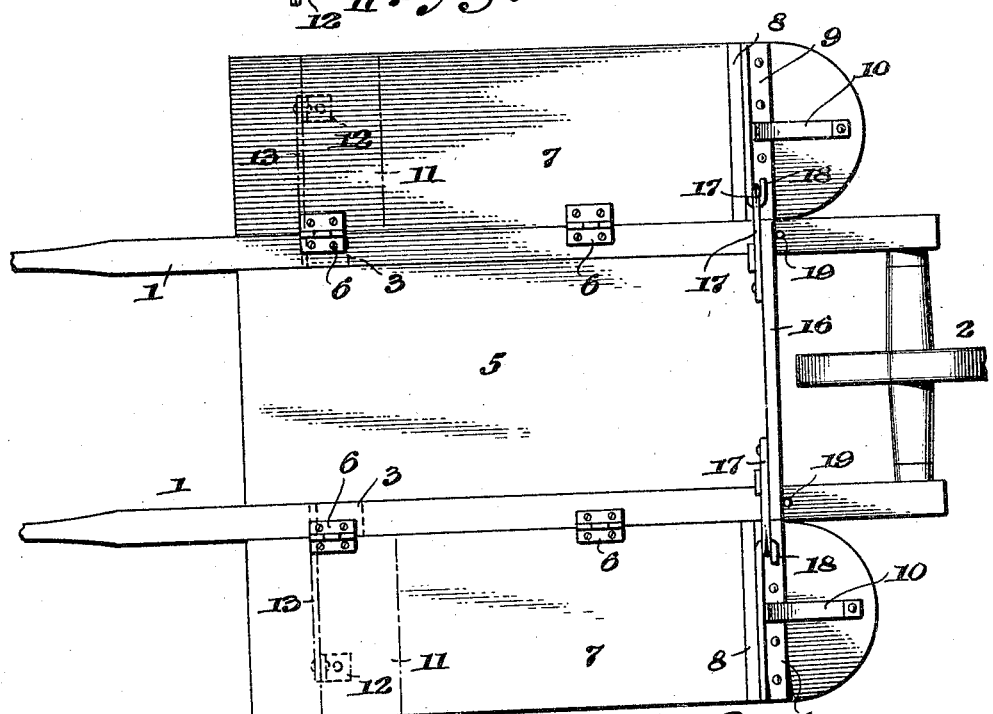
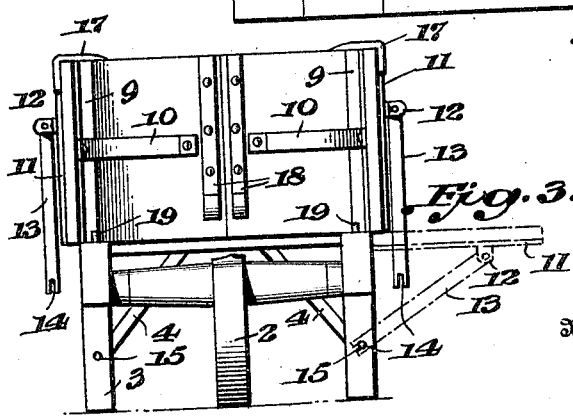
Inventor
Charles Vangiesen
By
Attorneys

UNITED STATES PATENT OFFICE.

CHARLES VANGIESEN, OF CARO, MICHIGAN.

FOLDABLE WHEELBARROW.

1,418,754.

Specification of Letters Patent.   Patented June 6, 1922.

Application filed June 9, 1919. Serial No. 302,926.

*To all whom it may concern:*

Be it known that I, CHARLES VANGIESEN, a citizen of the United States of America, residing at Caro, in the county of Tuscola and State of Michigan, have invented certain new and useful Improvements in Foldable Wheelbarrows, of which the following is a specification, reference being had therein to the accompanying drawings.

This invention relates to a wheel barrow body, and the primary object of my invention is to furnish a wheel barrow with a novel body that may be adjusted to increase or decrease the carrying capacity of the wheel barrow. In one position the body provides the usual inclosure having vertical side walls and in another position the side walls are lowered to provide a large platform for carrying merchandise and other matter. It is in this connection that the wheel barrow can be advantageously used on a farm and at places where a platform, devoid of side walls, will serve for carrying merchandise and other matter.

A further object of my invention is to provide, a simple, durable and inexpensive wheel barrow wherein the adjustable walls of the wheel barrow body are firmly braced and reinforced so that a large load may be safely carried.

The above and other objects are attained by a mechanical construction that will be hereinafter specifically described and then claimed, and reference will now be had to the drawing, wherein Figure 1 is a plan of the wheel barrow showing the body as an inclosure;

Fig. 2 is a similar view showing the body as a platform, and

Fig. 3 is a front view of the wheel barrow as shown in Fig. 1.

In the drawing, the reference numeral 1 denotes handle bars disposed in parallelism and having the forward ends thereof supported by a wheel 2 journaled between said handle bars, and contiguous to the rear ends of said handle bars are legs 3, which are braced, as at 4 relative to a bottom wall 5 between said handle bars, and this is the usual construction of the running gear or framework of a wheel barrow.

Suitably hinged or pivoted on the handle bars 1, as at 6, are side walls 7 that may be placed in parallel vertical positions, as shown in Fig. 1, or lowered to a horizontal position as shown in Fig. 2. The side walls 7 have the forward ends thereof rounded and provided with fixed end walls 8 which are held at a right angle to said side walls by angle bars 9 and angularly disposed braces 10, said angle bars and braces being suitably secured to the side walls to insure rigidity of the end walls 8 relative to the inner sides of the walls 7. When the side walls 7 are in a vertical position, as shown in Fig. 1, the end walls 8 meet and cooperate in providing a front end wall, which together with the side wall 7 and the bottom wall 5 provide a wheel barrow body that serves as an inclosure, said body having the top and rear end thereof open like an ordinary wheel barrow.

The outer sides of the walls 7 are provided with cleats 11 adjacent the rear ends thereof and on said cleats or angle brackets 12 to which are pivotally connected braces 13. The braces 13 have the lower ends thereof bifurcated for engagement with studs or pins 15 on the legs 3, although the free ends of the braces 13 may be otherwise connected to the legs 3, so that when the side walls 7 are lowered into the plane of the bottom wall 5, said walls will be firmly braced and cooperate with the bottom wall in providing a large platform.

When the side walls 7 are lowered to provide a platform, an auxiliary end wall 16 is brought into action and this wall also serves as a connecting device between the side walls 7, when the same are in a vertical position, as shown in Fig. 1. Considering Fig. 1, the auxiliary wall 16 is placed at the inner sides of the end walls 8, thus providing a front end wall of double thickness. The auxiliary end wall 16 braces the side walls 7 against inward folding or collapse and at the ends of the auxiliary wall 16 are hook shaped members 17 that engage over the upper edges of the side walls 7, as best shown in Fig. 3, and prevent outward folding or collapse of the side walls 7, until the auxiliary wall 16 is removed. These same hook-shaped members also engage hook-shaped members 18 on the end walls 8 when the side walls 7 are lowered as shown in Fig. 2. The auxiliary end wall 16 is therefore connected to the end walls 8 to cooperate therewith in providing a front wall for the large platform, and the lower edge of the auxiliary end wall 16 is braced by studs or dowels 19 on the handle bars 1. The auxiliary end wall 16 may be reversed, from the position shown, so as to aline with the walls 8 and place the member 17 outside of the body.

As shown in Fig. 1, a wheel barrow is provided of the usual carrying capacity and when it is desired to carry baskets, merchandise and other matter, the wheel barrow body may be converted into a platform, as shown in Fig. 2, said platform being of sufficient capacity to permit of a large quantity of merchandise being loaded on the wheel barrow. It is also possible to carry logs, fence posts and other long members that could not be conveniently carried in the wheel barrow body as shown in Fig. 1. It is now apparent that my improved wheel barrow can be advantageously used about a truck farm, and I would have it understood that the body of the wheel barrow may have any suitable running gear. Other changes falling within the scope of the appended claim may be resorted to without departing from the spirit of the invention.

What I claim is:—

A wheelbarrow body comprising a bottom wall, hinged side walls having ends projecting beyond the front end of said bottom wall, a fixed end wall on each side wall, an auxiliary end wall on the front end of said bottom wall and adapted to be retained thereon by said fixed end walls, angularly disposed braces connecting said fixed end walls to the projecting ends of said side walls so that said fixed end walls may be braced when said side walls are in a horizontal position and may cooperate with said fixed end walls in bracing said auxiliary end wall when said side walls are in a vertical position, and means carried by the ends of said auxiliary end wall adapted to engage over the upper edges of said side walls to retain said walls in vertical positions, and engage said fixed end walls when said side walls are in a horizontal position.

In testimony whereof I affix my signature in the presence of two witnesses.

CHARLES VANGIESEN.

Witnesses:
SAMUEL R. PARK,
OBER BLOUGH.